US008395822B2

(12) United States Patent  
Guo et al.

(10) Patent No.: US 8,395,822 B2  
(45) Date of Patent: Mar. 12, 2013

(54) IMAGE PROCESSING METHOD COMBINING COMPRESSION AND WATERMARK TECHNIQUES

(75) Inventors: Jing-Ming Guo, Taipei County (TW); Ming-Feng Wu, Taipei County (TW)

(73) Assignee: National Taiwan University of Science and Technology, Taipei (TW)

( * ) Notice: Subject to any disclaimer, the term of this patent is extended or adjusted under 35 U.S.C. 154(b) by 754 days.

(21) Appl. No.: 12/640,018

(22) Filed: Dec. 17, 2009

(65) Prior Publication Data

US 2011/0058188 A1   Mar. 10, 2011

(30) Foreign Application Priority Data

Sep. 7, 2009   (TW) .............................. 98130061 A (51) Int. Cl.
*H04N 1/40* (2006.01)
*H04N 1/46* (2006.01)
*G06F 15/00* (2006.01)
*G06K 1/00* (2006.01)
*G06K 15/00* (2006.01)

(52) U.S. Cl. ........ 358/3.28; 358/1.18; 358/1.9; 358/534
(58) Field of Classification Search ................... 358/1.9, 358/3.28, 1.18, 534; 382/100
See application file for complete search history.

(56) References Cited

U.S. PATENT DOCUMENTS

| 7,269,273 | B2 * | 9/2007 | Murakami | 382/100 |
| 7,646,883 | B2 * | 1/2010 | Kogure et al. | 382/100 |
| 8,049,930 | B2 * | 11/2011 | Guo et al. | 358/3.06 |
| 2002/0106102 | A1 * | 8/2002 | Au et al. | 382/100 |

* cited by examiner

*Primary Examiner* — Twyler Haskins
*Assistant Examiner* — Jonathan Beckley
(74) *Attorney, Agent, or Firm* — Jianq Chyun IP Office (57) ABSTRACT

An image processing method combining compression and watermark techniques is provided. In the method, a block is taken as a unit, and two ordered dither arrays mutually conjugate are used to code an original image, so as to insert information of a watermark into the original image during the coding process. Accordingly, the method generates a compressed image gives consideration to the compression ratio, the image quality and the data safety. On the other hand, the method also provides a procedure to extract the watermark from the compressed image, in order to verify whether the compressed image has been modified illegally.

18 Claims, 7 Drawing Sheets

|   |    |   |    |
|---|----|---|----|
| 5 | 14 | 2 | 7  |
| 3 | 10 | 4 | 12 |
| 9 | 6  | 13| 1  |
| 15| 0  | 8 | 11 |

| 126.67 | 120.67 | 128.67 | 125.33 |
|--------|--------|--------|--------|
| 128.00 | 123.33 | 127.33 | 122.00 |
| 124.00 | 126.00 | 121.33 | 129.33 |
| 120.00 | 130.00 | 124.67 | 126.67 |

| 120 | 130 | 120 | 130 |
|-----|-----|-----|-----|
| 120 | 130 | 120 | 120 |
| 120 | 120 | 120 | 120 |
| 130 | 120 | 120 | 120 |

| 0 | 1 | 0 | 1 |
|---|---|---|---|
| 0 | 1 | 0 | 0 |
| 0 | 0 | 0 | 0 |
| 1 | 0 | 0 | 0 |

| 120 | 130 | 120 | 130 |
|-----|-----|-----|-----|
| 120 | 130 | 120 | 120 |
| 120 | 120 | 120 | 120 |
| 130 | 120 | 120 | 120 |

| 0 | 1 | 0 | 1 |
|---|---|---|---|
| 0 | 1 | 0 | 0 |
| 0 | 0 | 0 | 0 |
| 1 | 0 | 0 | 0 |

| 10 | 1  | 13 | 8  |
|----|----|----|----|
| 12 | 5  | 11 | 3  |
| 6  | 9  | 2  | 14 |
| 0  | 15 | 7  | 4  |

| 126.67 | 120.67 | 128.67 | 125.33 |
| --- | --- | --- | --- |
| 128.00 | 123.33 | 127.33 | 122.00 |
| 124.00 | 126.00 | 121.33 | 129.33 |
| 120.00 | 130.00 | 124.67 | 126.67 |

FIG. 5D

| 0 | 0 | 1 | 1 |
| --- | --- | --- | --- |
| 1 | 0 | 0 | 0 |
| 0 | 0 | 0 | 1 |
| 0 | 1 | 0 | 0 |

| 5 | 14 | 2 | 7 |
| --- | --- | --- | --- |
| 3 | 10 | 4 | 12 |
| 9 | 6 | 13 | 1 |
| 15 | 0 | 8 | 11 |

| 123.33 | 129.33 | 121.33 | 124.67 |
| --- | --- | --- | --- |
| 122.00 | 126.67 | 123.67 | 128.00 |
| 126.00 | 124.00 | 128.67 | 120.67 |
| 130.00 | 120.00 | 125.33 | 127.33 |

FIG. 5G

| 0 | 1 | 0 | 0 |
| --- | --- | --- | --- |
| 0 | 0 | 0 | 1 |
| 0 | 0 | 1 | 0 |
| 1 | 0 | 0 | 0 |

IMAGE PROCESSING METHOD COMBINING COMPRESSION AND WATERMARK TECHNIQUES

CROSS-REFERENCE TO RELATED APPLICATION

This application claims the priority benefit of Taiwan application serial no. 98130061, filed on Sep. 7, 2009. The entirety of the above-mentioned patent application is hereby incorporated by reference herein and made a part of this specification.

BACKGROUND OF THE INVENTION

1. Field of the Invention

The present invention relates to an image processing method. More particularly, the present invention relates to an image processing method combining image compression and watermark techniques.

2. Description of Related Art

An image compression technique refers to a technique for compressing an image file with a great data amount into a format with a smaller data amount to facilitate storage and transmission. However, regarding a development of the image compression technique, besides improvement of performance and compression ratio is focused, to prevent image quality from excessive degradation is also a very important issue.

A conventional block truncation coding (BTC) is an image coding technique with advantages of a low complication and a high compression ratio. According to the BTC technique, an image is divided into a plurality of blocks, and the coding is performed while taking the block as a unit. In each of the coded blocks, each pixel is represented by a first or a second value according to a pixel average value of the block and a standard deviation. Therefore, as long as the pixel average value, the standard deviation and a corresponding relation of each pixel and the first or the second value are stored, such block can be represented.

It is easy to deduce that the larger the block used as the coding unit is, the higher compression ratio the generated image has, though the image quality is adversely affected. It is easy to lead to discontinuity of adjacent blocks to generate a blocking effect when the larger block is taken as the coding unit. When the blocking effect is excessively serious, human eyes cannot smoothly recognize features such as edges or outlines of the original image.

Moreover, most of the current image compression techniques focus on reaching a balance among the processing efficiency, the compression ratio and the image quality, though there is no corresponding solution for an information security issue that gradually becomes important recently.

SUMMARY OF THE INVENTION

Accordingly, the present invention is directed to an image processing method combining compression and watermark techniques, by which while an image is compressed, watermark information is inserted to the image. Moreover, a technique of extracting the watermark from a compressed image is also provided.

The present invention provides an image processing method combining compression and watermark techniques, which is used for processing an image equally divided into a plurality of blocks. Wherein, each block has M×N block pixels, and M and N are positive integer. First, a watermark is provided, and each watermark pixel in the watermark individually corresponds to one of the blocks. Next, one of the blocks is selected to be a target block, and an ordered dither array is obtained according to a maximum pixel value and a minimum pixel value of the block pixels in the target block. The ordered dither array includes non-repeated M×N array elements of a specific range, and each of the array elements corresponds to one of the block pixels. Moreover, a conjugate ordered dither array corresponding to the ordered dither array is established according to an upper limit of the specific range. Next, one of the ordered dither array and the conjugate ordered dither array is selected to serve as a comparison array according to the watermark pixel corresponding to the target block. Next, a pixel value of each block pixel is quantified to be a first value or a second value according to the array elements in the comparison array. Next, another one of the blocks is selected to be the target block, and the above steps are repeated until all of the blocks are selected, so as to generate a compressed image inserted with the watermark.

In an embodiment of the present invention, the image has P×Q image pixels, and a quantity of the watermark pixels is $$\frac{P}{M} \times \frac{Q}{N},$$

where P and Q are respectively multiples of M and N.

In an embodiment of the present invention, the upper limit of the specific range is M×N−1, and a lower limit of the specific range is 0.

In an embodiment of the present invention, the step of establishing the conjugate ordered dither array includes respectively calculating M×N differences between the upper limit and the array elements in the ordered dither array, and taking the differences as M×N array elements of the conjugate ordered dither array.

In an embodiment of the present invention, the watermark is belonged to a black and white image, and the pixel value of each of the watermark pixels is a first gray value or a second gray value. The first gray value is one of 0 and 255, and the second gray value is another one of 0 and 255.

In an embodiment of the present invention, the step of selecting the comparison array includes selecting the ordered dither array to be the comparison array when the pixel value of the watermark pixel corresponding to the target block is the first gray value, and selecting the conjugate ordered dither array to be the comparison array when the pixel value of the watermark pixel corresponding to the target block is the second gray value.

In an embodiment of the present invention, after the step of selecting the comparison array, the method further includes mapping the array elements in the comparison array to a plurality of mapping values between the maximum pixel value and the minimum pixel value.

In an embodiment of the present invention, the step of quantifying the pixel value of the block pixel includes following steps. First, one of the block pixels is selected, and in all of the mapping values, the mapping value corresponding to the selected block pixel is obtained. Next, a pixel value of the selected block pixel is compared to the obtained mapping value. If the pixel value of the selected block pixel is greater than or equal to the obtained mapping value, the first value is used to represent the pixel value of the selected block pixel. If the pixel value of the selected block pixel is smaller than the obtained mapping value, the second value is used to represent the pixel value of the selected block pixel. Next, another one of the block pixels is selected, and the above steps are repeated until all of the block pixels are selected.

In an embodiment of the present invention, the first value is the maximum pixel value, and the second value is the minimum pixel value.

The present invention provides an image processing method combining compression and watermark techniques, which is used for a compressed image inserted with a watermark. The compressed image is equally divided into a plurality of blocks respectively having M×N block pixels, wherein M and N are positive integer, and each block individually corresponds to a watermark pixel in the watermark. The method can be described as follows. First, one of the blocks is selected to be a processing block, wherein a pixel value of each of the block pixels in the processing block is a first value or a second value. Next, a pixel value average of the block pixels of the processing block is calculated, and the processing block is binarized according to the pixel value average to generate a binarized block having M×N block pixels. Next, an ordered dither array and a conjugate ordered dither array respectively having M×N array elements are obtained according to a maximum pixel value and a minimum pixel value of the block pixels of the processing block, and a first comparison block and a second comparison block respectively having M×N block pixels are established according to the pixel value average, the ordered dither array and the conjugate ordered dither array. Next, after similarities between the first comparison block and the binarized block and between the second comparison block and the binarized block are respectively calculated, if the first comparison block is relatively similar to the binarized block, it is determined that a pixel value of the watermark pixel corresponding to the processing block is a first gray value, and if the second comparison block is relatively similar to the binarized block, it is determined that the pixel value of the watermark pixel corresponding to the processing block is a second gray value. Next, another one of the blocks is selected to be the processing block, and the above steps are repeated until all of the blocks are selected, so as to extract the watermark inserted in the compressed image.

In an embodiment of the present invention, the step of binarizing the processing block according to the pixel value average to generate the binarized block includes comparing a pixel value of each of the block pixels in the processing block to the pixel value average, wherein when the pixel value of the compared block pixel is greater than the pixel value average, a first representing value is used to represent a pixel value of the block pixel located at a corresponding position in the binarized block, and when the pixel value of the compared block pixel is smaller than the pixel value average, a second representing value is used to represent the pixel value of the block pixel located at a corresponding position in the binarized block.

In an embodiment of the present invention, the step of establishing the first comparison block includes respectively mapping the array elements in the ordered dither array to M×N mapping values between the maximum pixel value and the minimum pixel value, and comparing each of the mapping values to the pixel value average, wherein when the compared mapping value is greater than the pixel value average, the first representing value is used to represent a pixel value of the block pixel located at a corresponding position in the first comparison block, and when the compared mapping value is smaller than the pixel value average, the second representing value is used to represent the pixel value of the block pixel located at a corresponding position in the first comparison block.

In an embodiment of the present invention, the step of establishing the second comparison block includes respectively mapping the array elements in the conjugate ordered dither array to M×N mapping values between the maximum pixel value and the minimum pixel value, and comparing each of the mapping values to the pixel value average, wherein when the compared mapping value is greater than the pixel value average, the first representing value is used to represent a pixel value of the block pixel located at a corresponding position in the second comparison block, and when the compared mapping value is smaller than the pixel value average, the second representing value is used to represent the pixel value of the block pixel located at a corresponding position in the second comparison block.

In an embodiment of the present invention, the array elements of the ordered dither array are in a specific range and are not repeated, wherein an upper limit of the specific range is M×N−1, and a lower limit of the specific range is 0. Moreover, the array elements in the conjugate ordered dither array are respectively differences between the upper limit and the array elements located at corresponding positions in the ordered dither array.

In an embodiment of the present invention, the step of calculating the similarities between the first comparison block and the binarized block and between the second comparison block and the binarized block includes counting a first total number of the block pixels having corresponding positions and same pixel values in the first comparison block and the binarized block, and counting a second total number of the block pixels having corresponding positions and same pixel values in the second comparison block and the binarized block, wherein if the first total number is greater than the second total number, it is determined that the first comparison block is relatively similar to the binarized block, and if the first total number is smaller than the second total number, it is determined that the second comparison block is relatively similar to the binarized block.

In an embodiment of the present invention, the first gray value is one of 0 and 255, and the second gray value is another one of 0 and 255.

In the present invention, when a block is taken as a unit to perforin a compression coding to an image, the corresponding ordered dither array and conjugate ordered dither array are first obtained according to the maximum pixel value and the minimum pixel value in the block, and then the corresponding ordered dither array or the conjugate ordered dither array is selected to compress the block according to the pixel values of the watermark pixel corresponding to the block. Therefore, information of a watermark is inserted into the image during the coding process, so as to generate a compressed image giving considerations of the compression ratio, the image quality and the data safety.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
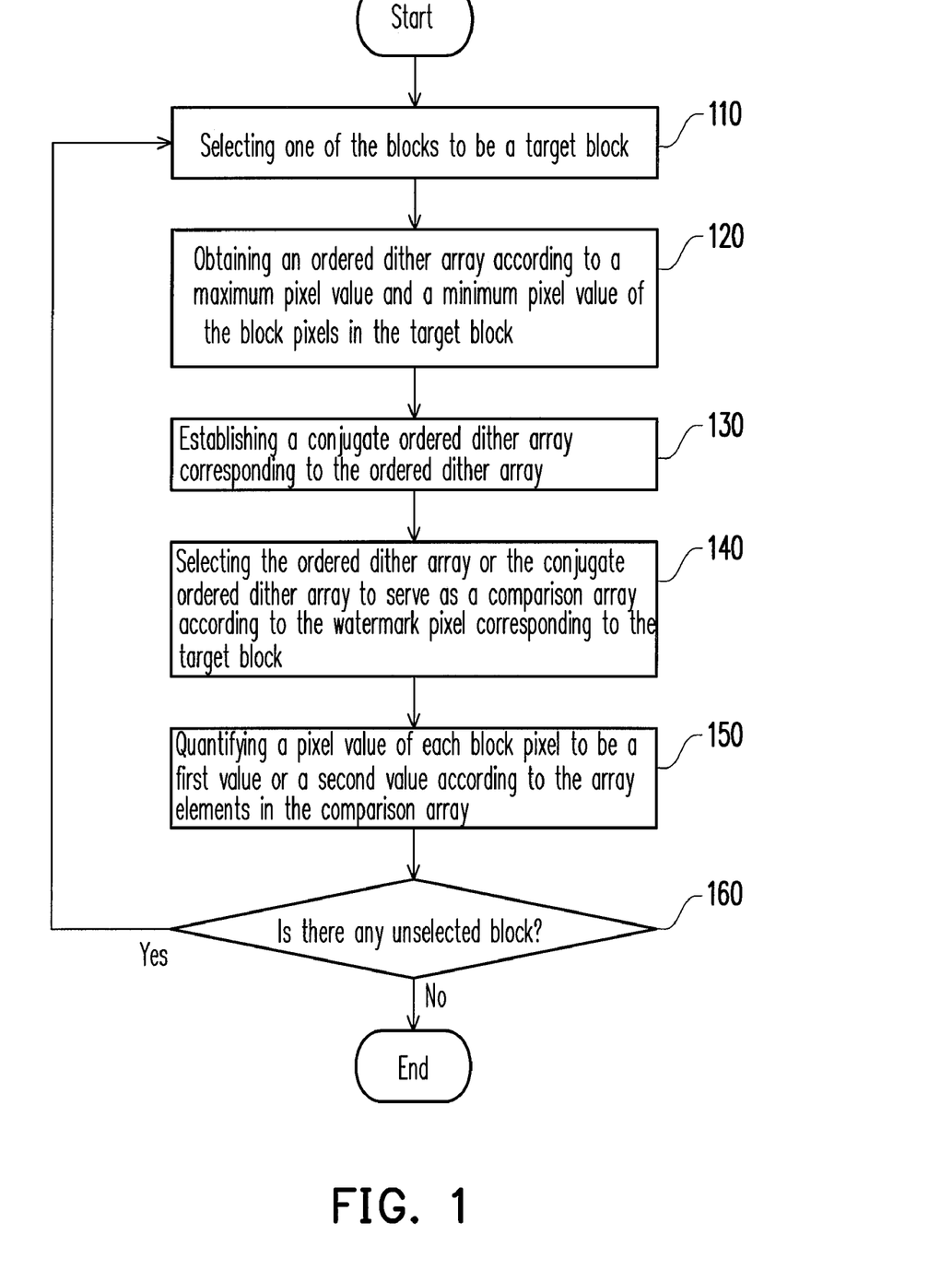
FIG. 1 is a flowchart illustrating an image processing method combining compression and watermark techniques according to an embodiment of the present invention.

FIG. 1 is a flowchart illustrating an image processing method combining compression and watermark techniques according to an embodiment of the present invention. The image processing method is used to process an image equally divided into a plurality of blocks, wherein the blocks in the image respectively have M×N block pixels, and M and N are positive integers. Detailed steps of inserting a watermark during the image compression process are described below.

In the present embodiment, the watermark to be inserted into the image has a plurality of watermark pixels, and each of the watermark pixels individually corresponds to one block in the image. In other words, a size of the watermark is limited by a size of the image and a size of the block. Assuming the image has P×Q image pixels (P and Q are respectively multiples of M and N), the size of the watermark is then $$\frac{P}{M} \times \frac{Q}{N}.$$

Namely, a quantity of the watermark pixels is $$\frac{P}{M} \times \frac{Q}{N}.$$

It should be notice that in the present embodiment, a pixel value of each of the watermark pixels can only be one of a first gray value and a second gray value. Wherein, the first gray value is one of 0 (black color) and 255 (white color), and the second gray value is another one of 0 and 255. In other words, the watermark is belonged to a black and white image. For simplicity's sake, in the following embodiments, the first gray value is assumed to be 0, and the second gray value is assumed to be 255.

When the image processing is started, first, in step 110, a target block is selected from all of the blocks included in the image. Next, in step 120, a maximum pixel value and a minimum pixel value of the block pixels of the target block are obtained, and an ordered dither array is obtained according to the maximum pixel value and the minimum pixel value. The ordered dither array includes non-repeated M×N array elements of a specific range, wherein an upper limit of the specific range is M×N−1, an lower limit thereof is 0. Each of the array elements corresponds to one of the block pixels in the target block.

In the present embodiment, the suitable ordered dither array is obtained according to a difference between the maximum pixel value and the minimum pixel value. In detail, when the block pixel is represented by 8 bits, the pixel value of each block pixel is between 0-255. Therefore, in the same target block, there are 256 possibilities (0-255) of the difference between the maximum pixel value and the minimum pixel value. In the present embodiment, before the image is processed, 256 ordered dither arrays corresponding to different differences are pre-produced, and the ordered dither arrays are, for example, recorded in a storage medium (a type of the storage medium is not limited by the present invention) in form of a look-up table. It should be noticed that the method of generating the ordered dither arrays is known by those with ordinary skill in the art, and therefore detailed description thereof is not repeated, and the method of generating the ordered dither arrays is not limited by the present invention.

After the suitable ordered dither array is obtained, in step S130, a conjugate ordered dither array corresponding to the ordered dither array is established according to the upper limit of the specific range. In the present embodiment, M×N differences between the upper limit and the array elements in the ordered dither array are respectively calculated, and the differences are taken as M×N array elements of the conjugate ordered dither array. In the conjugate ordered dither array, an array element $DA^*_{m,n}$ with a location of (m,n) can be represented by a following equation:

$$DA^*_{m,n} = (M \times N - 1) - DA_{m,n}, 0 \leq m < M, 0 \leq n < N$$

Where $DA_{m,n}$ represents an array element with a location of (m,n) in the ordered dither array. In an actual application, the conjugate ordered dither array corresponding to the ordered dither array can also be pre-produced before the image processing, and is unnecessarily to be calculated during the image processing, so as to reduce a complexity of such method.

Figure 2:
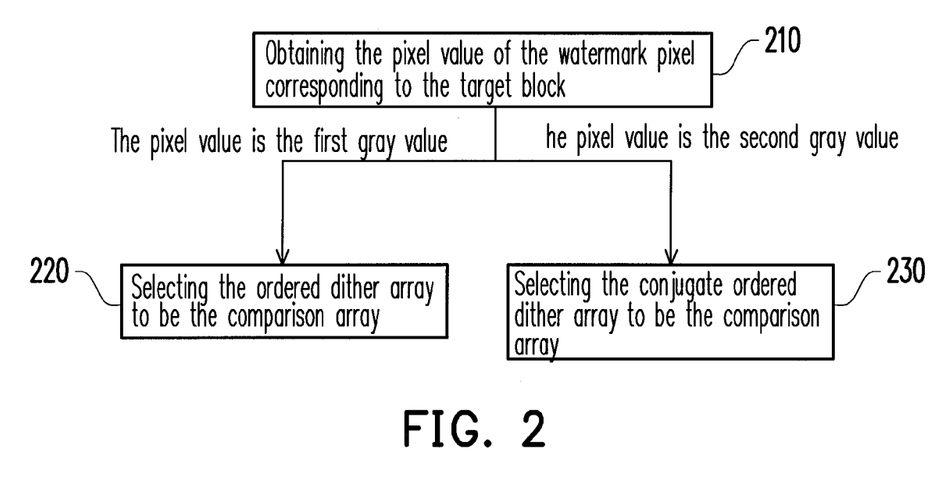
FIG. 2 is a flowchart illustrating a method of selecting a comparison array according to an embodiment of the present invention.

Next, in step 140, one of the ordered dither array and the conjugate ordered dither array is selected to serve as a comparison array to be referred during the image compression according to the watermark pixels corresponding to the target block. In the present embodiment, the watermark pixel ($w_i$, $w_j$) corresponding to the target block is obtained according to a following equation:

$$w_i = \left\lfloor \frac{i}{M} \right\rfloor, \quad w_j = \left\lfloor \frac{j}{N} \right\rfloor, \quad 0 \le i < P, \quad 0 \le j < Q$$

Where (i,j) represents coordinates of an upper left corner of the target block. Therefore, if a size of the target block A is 4×4, and the coordinates of the upper left corner of the target block A is (4,0), the watermark pixel corresponding to the target block A is then (1,0). FIG. 2 is a flowchart illustrating a method of selecting one of the ordered dither array and the conjugate ordered dither array to serve as the comparison array. Referring to FIG. 2, first, in step 210, a pixel value of the watermark pixel corresponding to the target block is obtained. If the obtained pixel value is the first gray value (in the present embodiment, the first gray value is 0), in step 220, the ordered dither array is selected to be the comparison array. Conversely, if the obtained pixel value is the second gray value (in the present embodiment, the second gray value is 255), in step 230, the conjugate ordered dither array is selected to be the comparison array.

Next, in step 150 of FIG. 1, the pixel value of each block pixel in the target block is quantified to be a first value or a second value according to the array elements in the comparison array. To quantify the pixel values of the block pixels, after the comparison array is selected according to the step 140, the array elements in the comparison array have to be first mapped to a plurality of mapping values between the maximum pixel value and the minimum pixel value. Namely, the array elements are normalized to be the corresponding mapping values according to the maximum pixel value and the minimum pixel value of the target block. The mapping values M(m,n) of the array elements $A_{m,n}$ are calculated according to a following equation:

$$M(m, n) = k \times \frac{A_{m,n} - A_{min}}{A_{max} - A_{min}} + \text{MIN\_val}$$

Where MIN_val represents the minimum pixel value of the target block, k represents a difference between the maximum pixel value and the minimum pixel value of the target block, $A_{max}$ is a maximum value in the comparison array, and $A_{min}$ is a minimum value in the comparison array.

Since each of the block pixels in the target block corresponds to one array element in the comparison array, the block pixels also respectively correspond to the mapping values of the array elements. Therefore, after one block pixel is selected, the mapping value corresponding to the block pixel is obtained from the mapping values. Then, the pixel value of the block pixel is compared to the obtained mapping value, and if the block pixel is greater than or equal to the obtained mapping value, the first value (for example, the maximum pixel value of the target block) is used to represent the pixel value of the block pixel. Conversely, if the block pixel is smaller than the obtained mapping value, the second value (for example, the minimum pixel value of the target block) is used to represent the pixel value of the block pixel. Thereafter, the other block pixels in the target block are continually selected, and are compared to the corresponding mapping values, so as to quantify the pixel values into the first value or the second value. Therefore, after the step 150 is executed, the pixel value of each block pixel in the target block is quantified into the first value or the second value, so that a coding operation of such target block is completed.

Next, in step 160, it is determined whether there is any unselected block, and if yes, the step 110 is repeated to select another block to serve as the target block, and the steps 120-160 are repeated. According to the image processing method of the present embodiment, the steps of FIG. 1 are performed to each of the blocks in the image, and the flow of the image processing method is ended until all of the blocks are processed, so as to generate a compressed image inserted with the watermark.

Figure 3A:
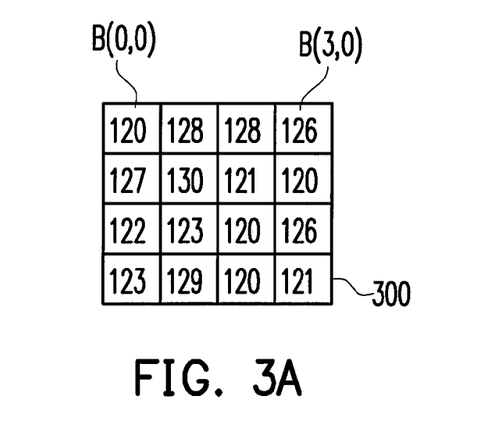
FIG. 3A is a schematic diagram illustrating a target block according to an embodiment of the present invention.
Figure 3B:
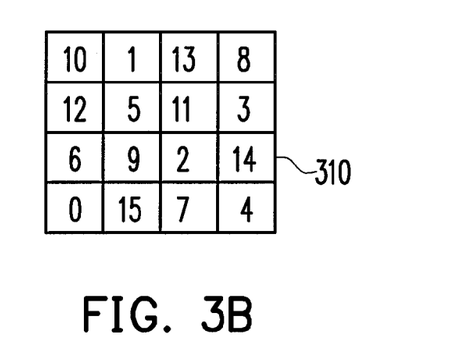
FIG. 3B is a schematic diagram illustrating an ordered dither array according to an embodiment of the present invention.
Figure 3C:
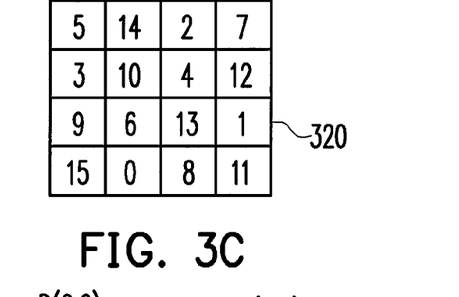
FIG. 3C is a schematic diagram illustrating a conjugate ordered dither array according to an embodiment of the present invention.

To further describe the present invention, FIG. 3A to FIG. 3F are diagram illustrating detailed steps of compressing a target block of the image and meanwhile inserting a watermark. In the present embodiment, assuming a size of each block in the image is 4×4 (i.e. each block has 4×4 block pixels), and the target block to be processed is the target block 300 shown in FIG. 3A. In the target block 300, a maximum pixel value of the block pixels is 130, and a minimum pixel value thereof is 120. Therefore, when the target block 300 is processed, an ordered dither array (an ordered dither array 310 shown in FIG. 3B) corresponding to a difference (i.e. 10) between the maximum pixel value and the minimum pixel value has to be obtained. A conjugate ordered dither array 320 corresponding to the ordered dither array 310 is shown in FIG. 3C.

Next, it is determined whether the pixel value of the watermark pixel corresponding to the target block 300 is 0 or 255. Here, assuming the pixel value of the watermark pixel corresponding to the target block 300 is 0, the ordered dither array 310 is then selected to be the comparison array according to the description of the above embodiment, and the array elements of the ordered dither array 310 are mapped to a plurality of mapping values between 120-130. A mapping result thereof is shown in FIG. 3D.

Figure 3D:
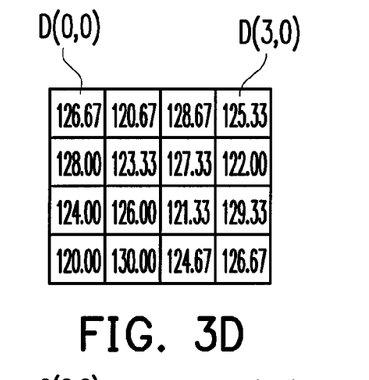
FIG. 3D is a schematic diagram illustrating mapping values corresponding to an ordered dither array according to an embodiment of the present invention.
Figure 3E:
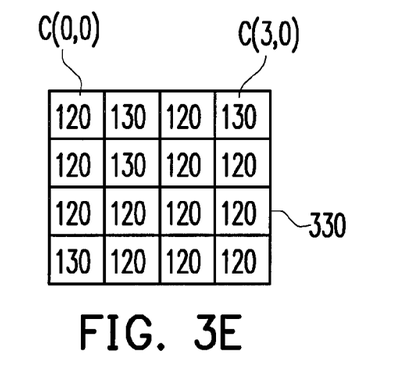
FIGS. 3E and 3F are schematic diagrams illustrating a compressed target block according to an embodiment of the present invention.

Referring to FIG. 3A, FIG. 3D and FIG. 3E, taking a block pixel B(0,0) of the target block 300 as an example, a pixel value of the block pixel B(0,0) is 120, and a mapping value D(0,0) corresponding to the block pixel B(0,0) is 126.67. Since the pixel value is smaller than the mapping value, in a compressed block 330 representing a compression result, a pixel value of a block pixel C(0,0) located at a position corresponding to the block pixel B(0,0) is the minimum pixel value (i.e. 120) in the target block 300. Moreover, after a pixel value of a block pixel B(3,0) of the target block 300 is compared to a corresponding mapping value D(3,0) thereof, since the pixel value (i.e. 126) of the block pixel B(3,0) is greater than the mapping value D(3,0) (i.e. 125.33), in the compressed block 330, a pixel value of a block pixel C(3,0) located at a corresponding position is the maximum pixel value (i.e. 130) in the target block 300.

Figure 3F:
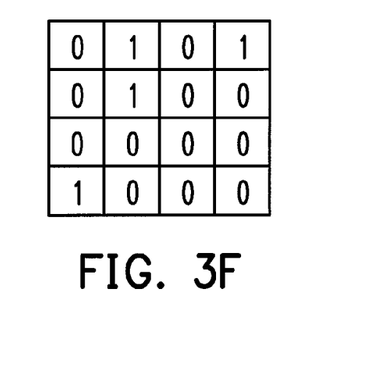

After each of the block pixels in the target block 300 is compared and quantified, the compressed block 330 representing the compression result is obtained. In an actual application, to further reduce a storage capacity, as shown in FIG. 3F, a numeral 0 is used to represent 120, and a numeral 1 is used to represent 130. Therefore, as long as a 4×4 bit map shown in FIG. 3F and the actual values respectively represented by the numerals 0 and 1 are recorded, it can represent a compression result of the target block 300 that is inserted with the watermark information.

As described above, since each of the blocks of the image is represented by only two kinds of numerals, the compression ratio can be increased. When the block is compressed, whether the ordered dither array or the conjugate ordered dither array is referred during the compression is determined according to whether the pixel value of the corresponding pixel in the watermark is white or black, so as to insert the watermark while the image is compressed. Not only the compressed image obtained according to the above processing has the watermark information, but also a degradation degree of the image is within an acceptable range of human eyes. Therefore, on a premise that the compression ratio is increased, the image quality is maintained and the watermark is inserted. However, it should be noticed that types and contents of the image are not limited by the present invention, and the image can be a picture, a file, or various digital data.

Regarding the compressed image inserted with the watermark, if the integrated watermark can be extracted from the compressed image, it can be determined that the compressed image is not illegally modified. Therefore, the present invention provides another image processing method combining the compression and the watermark techniques for extracting the watermark from the compressed image, so that a user can determine whether the image is properly protected according to integrity of the watermark.

Figure 4:
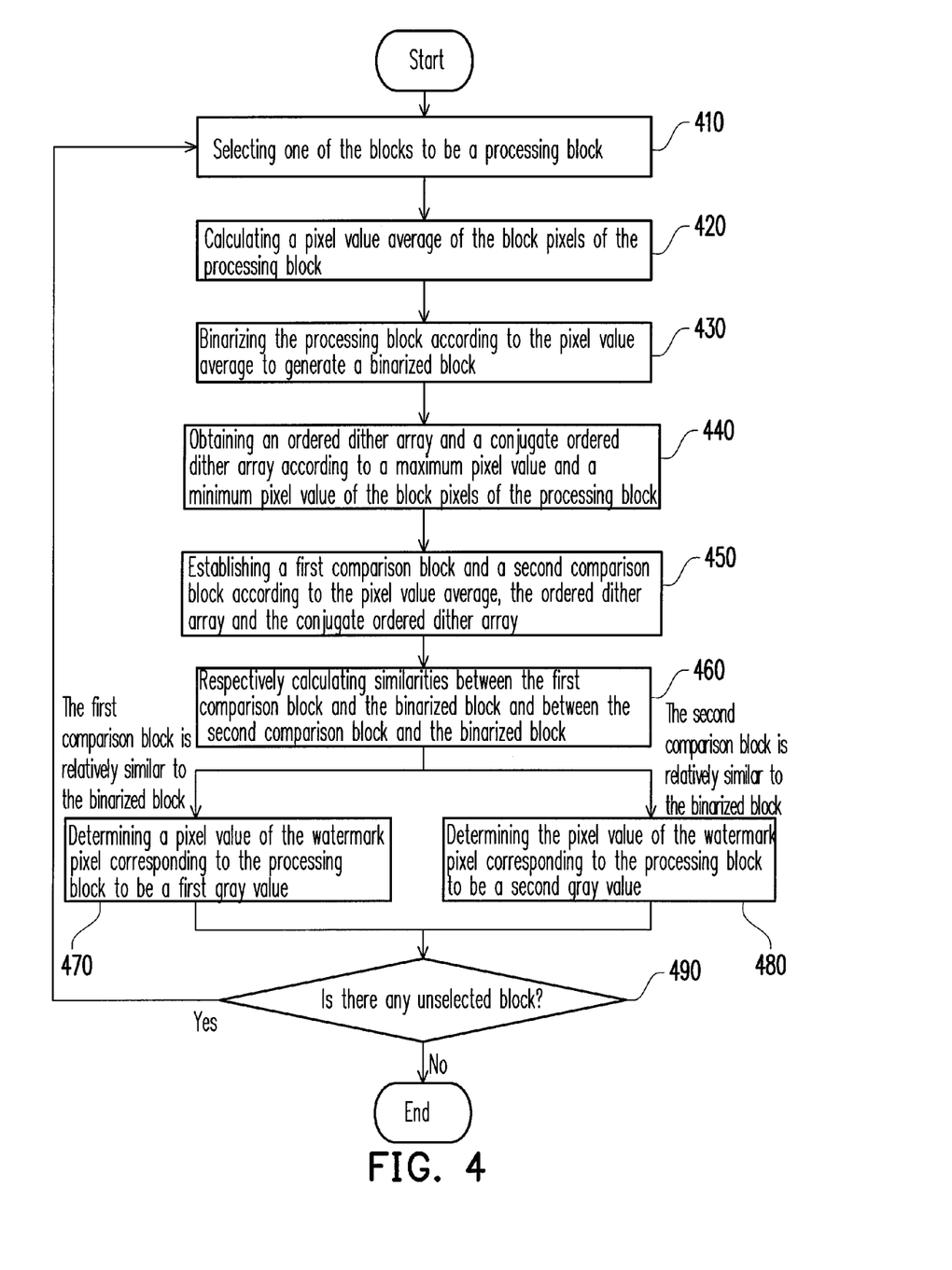
FIG. 4 is a flowchart illustrating an image processing method combining compression and watermark techniques according to an embodiment of the present invention.

FIG. 4 is a flowchart illustrating an image processing method combining the compression and the watermark techniques according to an embodiment of the present invention. In the present embodiment, the image is assumed to be a compressed image inserted with the watermark that has been processed by the steps of FIG. 1. The compressed image is equally divided into a plurality of blocks, wherein each of the blocks has M×N block pixels (M and N are positive integers), and each block individually corresponds to a watermark pixel in the watermark. According to the aforementioned embodiment, since the watermark is belonged to the black and white image, the pixel value of each watermark pixel in the watermark can only be 0 which represents the black color (which is referred to as a first gray level hereinafter) or 255 which represents the white color (which is referred to as a second gray level hereinafter). Therefore, during a process of restoring the watermark, whether the pixel value of each watermark pixel is the first gray value or the second gray value is required to be determined.

First, in step 410, a block is selected from all of the blocks of the compressed image to serve as a processing block. Since the compressed image is obtained according to the image processing flow of FIG. 1, the pixel value of each block pixel in the processing block can only be the first value or the second value. Next, in step 420, a pixel value average of the block pixels of the processing block is calculated.

Next, in step 430, the processing block is binarized according to the pixel value average to correspondingly generate a binarized block having M×N block pixels. In detail, the pixel value of each block pixel in the processing block is compared to the pixel value average, wherein when the pixel value of the compared block pixel is greater than the pixel value average, a first representing value (for example, 1) is used to represent the pixel value of the corresponding block pixel in the binarized block, and when the pixel value of the compared block pixel is smaller than the pixel value average, a second representing value (for example, 0) is used to represent the pixel value of the corresponding block pixel in the binarized block.

Next, in step 440, an ordered dither array and a conjugate ordered dither array respectively having M×N array elements are obtained according to a maximum pixel value and a minimum pixel value of the block pixels of the processing block. In the present embodiment, the suitable ordered dither array and the conjugate ordered dither array are obtained according to a difference between the maximum pixel value and the minimum pixel value. Since definitions of the ordered dither array and the conjugate ordered dither array are the same or similar to that of the aforementioned embodiment, detailed descriptions thereof are not repeated.

After the ordered dither array and the conjugate ordered dither array are obtained, in step 450, a first comparison block and a second comparison block respectively having M×N block pixels are established according to the pixel value average, the ordered dither array and the conjugate ordered dither array. Detailed steps of establishing the first comparison block and the second comparison block are described below.

When the first comparison block is established, the array elements in the ordered dither array are first mapped to M×N mapping values between the maximum pixel value and the minimum pixel value, and then each of the mapping values is compared to the pixel value average, so as to binarize the mapping values according to the pixel value average. Wherein, when the compared mapping value is greater than the pixel value average, the first representing value (for example, 1) is used to represent the pixel value of the corresponding block pixel in the first comparison block, and when the compared mapping value is smaller than the pixel value average, the second representing value (for example, 0) is used to represent the pixel value of the corresponding block pixel in the first comparison block.

The steps of establishing the second comparison block are similar to the steps of establishing the first comparison block. First, the array elements in the conjugate ordered dither array are mapped to M×N mapping values between the maximum pixel value and the minimum pixel value, and then each mapping value is compared to the pixel value average, so as to binarize the mapping values according to the pixel value average. Wherein, when the compared mapping value is greater than the pixel value average, the first representing value is used to represent the pixel value of the corresponding block pixel in the second comparison block, and when the compared mapping value is smaller than the pixel value average, the second representing value is used to represent the pixel value of the corresponding block pixel in the second comparison block.

It should be noticed that when the first comparison block and the second comparison block are established, the array elements in the ordered dither array and the conjugate ordered dither array are respectively mapped to the suitable mapping values. Since the method of mapping the array elements to the mapping values are the same or similar as that described in the aforementioned embodiment, detailed description thereof is not repeated.

Next, in step 460, similarities between the first comparison block and the binarized block and between the second comparison block and the binarized block are respectively calculated. In the present embodiment, in the first comparison block and the binarized block, a first total number of the block pixels having the corresponding positions and the same pixel values are counted. Then, in the second comparison block and the binarized block, a second total number of the block pixels having the corresponding positions and the same pixel values are counted, wherein if the first total number is greater than the second total number, it is determined that the first comparison block is relatively similar to the binarized block, and if the first total number is smaller than the second total number, it is determined that the second comparison block is relatively similar to the binarized block.

If the first comparison block is relatively similar to the binarized block, in step 470, it is determined that the pixel value of the watermark pixel corresponding to the processing block is a first gray value (in the present embodiment, the first gray value is 0). Conversely, if the second comparison block is relatively similar to the binarized block, in step 480, it is determined that the pixel value of the watermark pixel corresponding to the processing block is a second gray value (in the present embodiment, the first gray value is 255).

Next, in step 490, it is determined whether there is any unselected block, and if yes, the step 410 is repeated to again select another block to serve as the processing block, and the steps of FIG. 4 are repeated until all of the blocks in the compressed image are selected. Namely, according to the image processing method of the present embodiment, the steps of FIG. 4 are performed to each of the blocks in the compressed image, so as to extract the watermark inserted in the compressed image according to a corresponding relationship between the blocks and the watermark pixels. Moreover, as long as the extracted watermark is an integrated pattern without damage or spots, the original image can be guaranteed not being modified or spoiled.

Figure 5A:
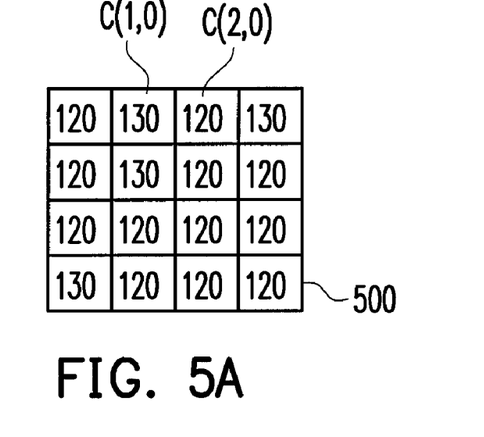
FIG. 5A is a schematic diagram illustrating a processing block according to an embodiment of the present invention.

FIGS. 5A-5H are diagrams illustrating a detailed flow of extracting the watermark from the compressed image according to an embodiment of the present invention. Taking one block as an example, assuming the current processed block is a processing block 500 shown in FIG. 5A. As shown in FIG. 5A, the maximum pixel value of the processing block 500 is 130, the minimum pixel value thereof is 120, the pixel value average is 127.5, and the difference between the maximum pixel value and the minimum pixel value is 10.

Figure 5B:
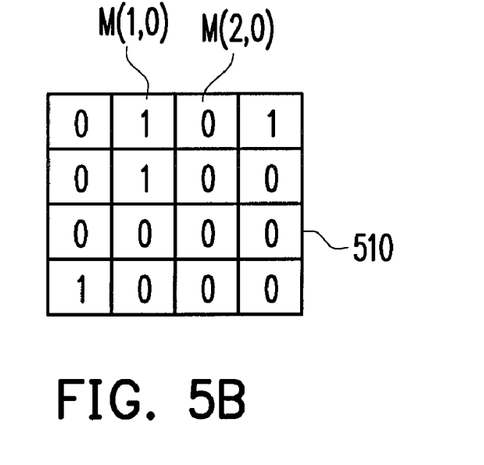
FIG. 5B is a schematic diagram illustrating a binarized block according to an embodiment of the present invention.

FIG. 5B illustrates a binarized block 510 generated by binarizing the processing block 500 according to the pixel value average (i.e. 127.5). Comparing FIG. 5A and FIG. 5B, it is known that in all of the block pixels of the processing block 500, if the pixel value of the block pixel (for example, the block pixel $C(1,0)$) is greater than the pixel value average, the pixel value of the block pixel (i.e. $M(1,0)$) located at the corresponding position in the binarized block 510 is 1. Conversely, if the pixel value of the block pixel (for example, the block pixel $C(2,0)$) is smaller than the pixel value average, the pixel value of the block pixel (i.e. $M(2,0)$) located at the corresponding position in the binarized block 510 is 0.

Figure 5C:
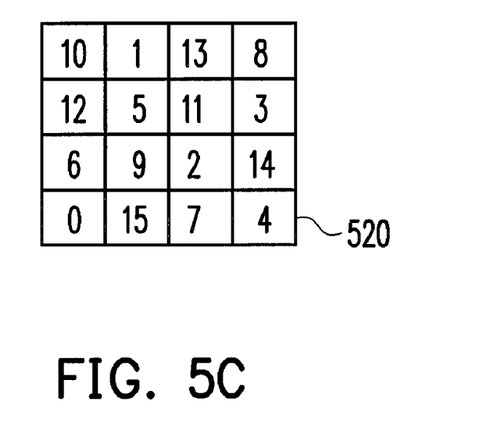
FIG. 5C is a schematic diagram illustrating an ordered dither array according to an embodiment of the present invention.
Figure 5D:
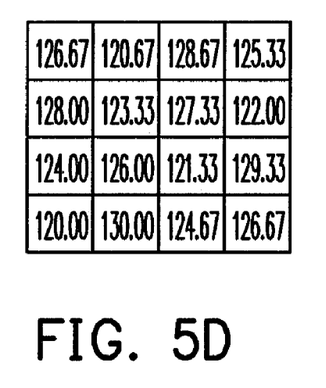
FIG. 5D is a schematic diagram illustrating mapping values corresponding to an ordered dither array according to an embodiment of the present invention.
Figure 5E:
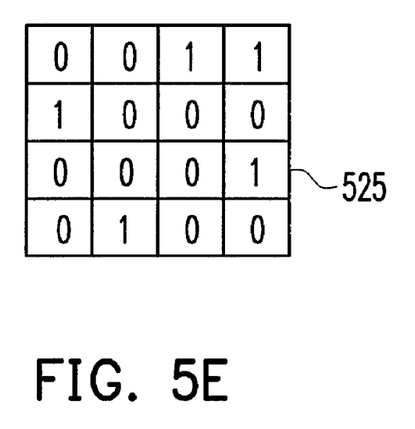
FIG. 5E is a schematic diagram illustrating a first comparison block according to an embodiment of the present invention.

Assuming the ordered dither array corresponding to the difference 10 is an ordered dither array 520 shown in FIG. 5C, and FIG. 5D illustrates the mapping values obtained by mapping the array elements in the ordered dither array 520 to a range between 120-130, after the mapping values of FIG. 5D are binarized according to the pixel value average, a generated first comparison block 525 is then shown as FIG. 5E.

Figure 5F:
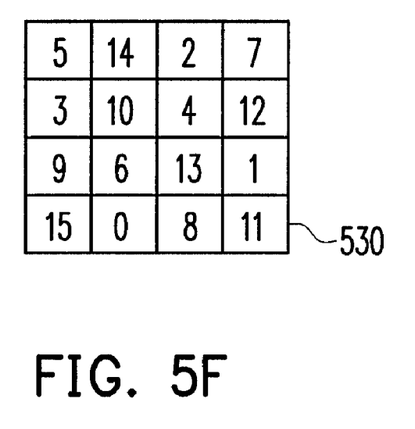
FIG. 5F is a schematic diagram illustrating a conjugate ordered dither array according to an embodiment of the present invention.
Figure 5G:
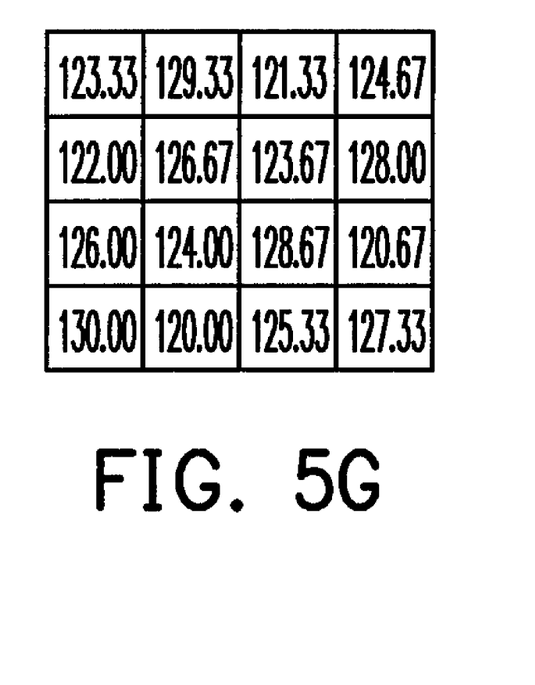
FIG. 5G is a schematic diagram illustrating mapping values corresponding to a conjugate ordered dither array according to an embodiment of the present invention.
Figure 5H:
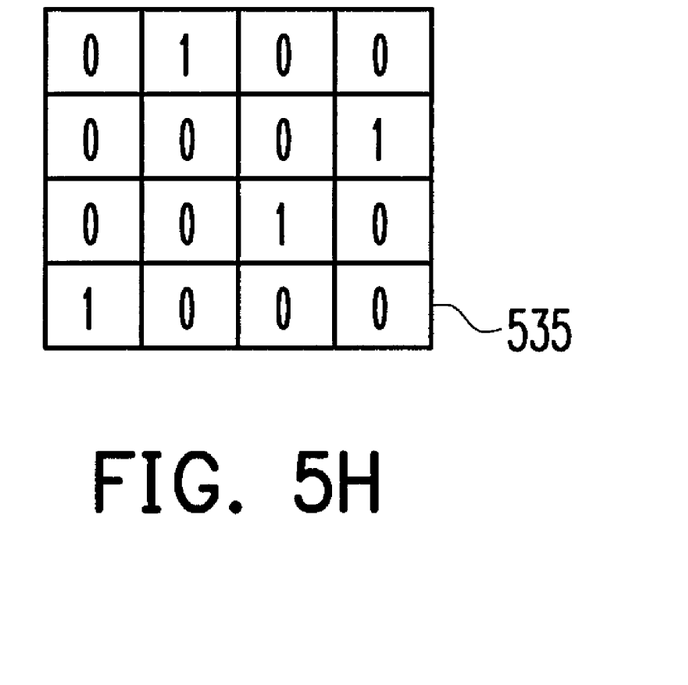
FIG. 5H is a schematic diagram illustrating a second comparison block according to an embodiment of the present invention.

Assuming the conjugate ordered dither array corresponding to the ordered dither array 520 is a conjugate ordered dither array 530 shown in FIG. 5F, and FIG. 5G illustrates the mapping values obtained by mapping the array elements in the conjugate ordered dither array 530 to the range between 120-130, after the mapping values of FIG. 5G are binarized according to the pixel value average, a generated second comparison block 535 is then shown as FIG. 5H.

After comparing the first comparison block 525 to the binarized block 510 and comparing the second comparison block 535 to the binarized block 510, it is known that in the first comparison block 525 and the binarized block 510, a total number of the block pixels having corresponding positions and the same pixel values is 8, and in the second comparison block 535 and the binarized block 510, a total number of the block pixels having corresponding positions and the same pixel values is 12. Therefore, it is determined that the second comparison block 535 is relatively similar to the binarized block 510, so that the pixel value of the watermark pixel corresponding to the processing block 500 is determined to be 255 (i.e. the white color).

As long as the above determination is performed to each of the blocks in the compressed image, the pixel value of each of the watermark pixels in the watermark can be determined, so that the watermark can be restored, and the watermark without damage represents that the compressed image is not illegally modified.

In summary, according to the image processing method combining the compression and the watermark techniques, not only the compression ratio and the image quality are considered while the image is compressed, but also the watermark can be simultaneously inserted into the image, so that information security is improved. Moreover, the present invention also provides a method for extracting the watermark from the compressed image, so as to verify whether the compressed image has been modified illegally, and accordingly achieve a purpose of copyright protection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method combining compression and watermark techniques, used for processing an image equally divided into a plurality of blocks, wherein each block has M×N block pixels, and M and N are positive integer, the method comprising:
   a. providing a watermark, and a plurality of watermark pixels in the watermark individually corresponding to one of the blocks;
   b. selecting one of the blocks to be a target block;
   c. obtaining an ordered dither array according to a maximum pixel value and a minimum pixel value of the block pixels in the target block, wherein the ordered dither array includes non-repeated M×N array elements of a specific range, and each of the array elements corresponds to one of the block pixels;
   d. establishing a conjugate ordered dither array corresponding to the ordered dither array according to an upper limit of the specific range;
   e. selecting the ordered dither array or the conjugate ordered dither array to serve as a comparison array according to the watermark pixel corresponding to the target block;
   f. quantifying a pixel value of each block pixel to be a first value or a second value according to the array elements in the comparison array; and
   g. selecting another one of the blocks to be the target block, and repeating the step c. to the step g. until all of the blocks are selected, so as to generate a compressed image inserted with the watermark.

2. The image processing method combining compression and watermark techniques as claimed in claim 1, wherein the image has P×Q image pixels, and a quantity of the watermark pixels is $$\frac{P}{M} \times \frac{Q}{N},$$

where P and Q are respectively multiples of M and N.

3. The image processing method combining compression and watermark techniques as claimed in claim 1, wherein the upper limit of the specific range is M×N−1, and a lower limit of the specific range is 0.

4. The image processing method combining compression and watermark techniques as claimed in claim 1, wherein the step d. comprises:
respectively calculating M×N differences between the upper limit and the array elements in the ordered dither array; and
taking the differences as M×N array elements of the conjugate ordered dither array.

5. The image processing method combining compression and watermark techniques as claimed in claim 1, wherein the watermark is belonged to a black and white image, and the pixel value of each of the watermark pixels is a first gray value or a second gray value.

6. The image processing method combining compression and watermark techniques as claimed in claim 5, wherein the step e. comprises:
selecting the ordered dither array to be the comparison array when the pixel value of the watermark pixel corresponding to the target block is the first gray value; and
selecting the conjugate ordered dither array to be the comparison array when the pixel value of the watermark pixel corresponding to the target block is the second gray value.

7. The image processing method combining compression and watermark techniques as claimed in claim 5, wherein the first gray value is one of 0 and 255, and the second gray value is another one of 0 and 255.

8. The image processing method combining compression and watermark techniques as claimed in claim 1, wherein after the step e., the method further comprising:
mapping the array elements in the comparison array to a plurality of mapping values between the maximum pixel value and the minimum pixel value.

9. The image processing method combining compression and watermark techniques as claimed in claim 8, wherein the step f. comprises:
selecting one of the block pixels;
obtaining the mapping value corresponding to the selected block pixel from the mapping values;
comparing a pixel value of the selected block pixel to the obtained mapping value;
using the first value to represent the pixel value of the selected block pixel if the pixel value of the selected block pixel is greater than or equal to the obtained mapping value;
using the second value to represent the pixel value of the selected block pixel if the pixel value of the selected block pixel is smaller than the obtained mapping value; and
selecting another one of the block pixels and repeating the above steps until all of the block pixels are selected.

10. The image processing method combining compression and watermark techniques as claimed in claim 1, wherein the first value is the maximum pixel value, and the second value is the minimum pixel value.

11. An image processing method combining compression and watermark techniques, used for a compressed image inserted with a watermark, wherein the compressed image is equally divided into a plurality of blocks respectively having M×N block pixels, wherein M and N are positive integer, and each of the blocks individually corresponds to a watermark pixel in the watermark, the method comprising:
selecting one of the blocks to be a processing block, wherein a pixel value of each of the block pixels in the processing block is a first value or a second value;
calculating a pixel value average of the block pixels of the processing block;
binarizing the processing block according to the pixel value average to generate a binarized block having M×N block pixels;
obtaining an ordered dither array and a conjugate ordered dither array respectively having M×N array elements according to a maximum pixel value and a minimum pixel value of the block pixels of the processing block;
establishing a first comparison block and a second comparison block respectively having M×N block pixels according to the pixel value average, the ordered dither array and the conjugate ordered dither array;
respectively calculating similarities between the first comparison block and the binarized block and between the second comparison block and the binarized block;
determining a pixel value of the watermark pixel corresponding to the processing block to be a first gray value if the first comparison block is relatively similar to the binarized block;
determining the pixel value of the watermark pixel corresponding to the processing block to be a second gray value if the second comparison block is relatively similar to the binarized block; and
selecting another one of the blocks to be the processing block, and repeating the above steps until all of the blocks are selected, so as to extract the watermark inserted in the compressed image.

12. The image processing method combining compression and watermark techniques as claimed in claim 11, wherein the step of binarizing the processing block according to the pixel value average to correspondingly generate the binarized block comprises:
comparing a pixel value of each of the block pixels in the processing block to the pixel value average;
using a first representing value to represent a pixel value of the block pixel located at a corresponding position in the binarized block when the pixel value of the compared block pixel is greater than the pixel value average; and
using a second representing value to represent the pixel value of the block pixel located at a corresponding position in the binarized block when the pixel value of the compared block pixel is smaller than the pixel value average.

13. The image processing method combining compression and watermark techniques as claimed in claim 12, wherein the step of establishing the first comparison block comprises:
respectively mapping the array elements in the ordered dither array to M×N mapping values between the maximum pixel value and the minimum pixel value;
comparing each of the mapping values to the pixel value average;
using the first representing value to represent the pixel value of the block pixel located at a corresponding position in the first comparison block when the compared mapping value is greater than the pixel value average; and
using the second representing value to represent the pixel value of the block pixel located at a corresponding position in the first comparison block when the compared mapping value is smaller than the pixel value average.

14. The image processing method combining compression and watermark techniques as claimed in claim 12, wherein the step of establishing the second comparison block comprises:
respectively mapping the array elements in the conjugate ordered dither array to M×N mapping values between the maximum pixel value and the minimum pixel value;

comparing each of the mapping values to the pixel value average;

using the first representing value to represent a pixel value of the block pixel located at a corresponding position in the second comparison block when the compared mapping value is greater than the pixel value average; and using the second representing value to represent the pixel value of the block pixel located at a corresponding position in the second comparison block when the compared mapping value is smaller than the pixel value average.

15. The image processing method combining compression and watermark techniques as claimed in claim 11, wherein the array elements of the ordered dither array are in a specific range and are not repeated, and an upper limit of the specific range is M×N−1, and a lower limit of the specific range is 0.

16. The image processing method combining compression and watermark techniques as claimed in claim 15, wherein the array elements in the conjugate ordered dither array are respectively differences between the upper limit and the array elements located at corresponding positions in the ordered dither array.

17. The image processing method combining compression and watermark techniques as claimed in claim 11, wherein the step of calculating the similarities between the first comparison block and the binarized block and between the second comparison block and the binarized block comprises:

counting a first total number of the block pixels having corresponding positions and same pixel values in the first comparison block and the binarized block;

counting a second total number of the block pixels having corresponding positions and same pixel values in the second comparison block and the binarized block;

determining the first comparison block to be relatively similar to the binarized block if the first total number is greater than the second total number; and determining the second comparison block to be relatively similar to the binarized block if the first total number is smaller than the second total number.

18. The image processing method combining compression and watermark techniques as claimed in claim 11, wherein the first gray value is one of 0 and 255, and the second gray value is another one of 0 and 255.

* * * * *